United States Patent [19]
Oono et al.

[11] Patent Number: 5,930,053
[45] Date of Patent: Jul. 27, 1999

[54] DRIVE APPARATUS FOR ZOOM LENS BARREL

[75] Inventors: Masahiro Oono, Saitama-ken; Hisao Iwanade, Tokyo; Noboru Saitoh, Saitama-ken; Koji Sato, Saitama-ken; Sukenori Shiba, Saitama-ken; Tatsuya Yoshida, Saitama-ken; Nobuyuki Nagai, Saitama-ken, all of Japan

[73] Assignee: Asahi Kogaku Kogyo Kabushiki Kaisha, Tokyo, Japan

[21] Appl. No.: 08/987,783

[22] Filed: Dec. 9, 1997

[30] Foreign Application Priority Data

Dec. 12, 1996  [JP]  Japan .................................. 8-332075

[51] Int. Cl.$^6$ .................................................. G02B 15/14
[52] U.S. Cl. .............................................................. 359/696
[58] Field of Search .................................... 359/694, 695, 359/696, 697, 698

[56] References Cited

U.S. PATENT DOCUMENTS

| | | | |
|---|---|---|---|
| 5,016,993 | 5/1991 | Akitake | 359/696 |
| 5,113,261 | 5/1992 | Morisawa | 359/700 |
| 5,266,992 | 11/1993 | Takaoka et al. | 354/222 |
| 5,485,236 | 1/1996 | Arai et al. | 354/448 |
| 5,592,335 | 1/1997 | Omi et al. | 359/695 |
| 5,774,282 | 6/1998 | Kohmoto et al. | 359/695 |

*Primary Examiner*—Georgia Epps
*Assistant Examiner*—Younggil Timothy Lee
*Attorney, Agent, or Firm*—Greenblum & Bernstein, P.L.C.

[57] ABSTRACT

A drive apparatus for a zoom lens barrel having a plurality of movable lens groups, comprising: a lens barrel body which supports lens frames of the movable lens groups to move linearly in the optical axis direction, a lens drive unit which is assembled independently of the lens barrel body, driven pins provided on the lens frames and projecting outward from the barrel body in the same direction, and a plurality of drive members having engaging portions engageable with the driven pins. The drive motor which independently drives the drive members and drive gears connects the drive members to the drive motor, is provided in said lens drive unit. The lens drive unit is secured to the lens barrel body in a state that the driven pins projecting from the lens barrel body are engaged by the engaging portions of the corresponding drive members of the lens drive unit.

7 Claims, 18 Drawing Sheets

DRIVE APPARATUS FOR ZOOM LENS BARREL

BACKGROUND OF THE INVENTION

1. Field of the Invention

The present invention relates to a drive apparatus for a zoom lens barrel.

2. Description of the Related Art

A zoom lens includes at least two movable zoom lens groups which are moved in predetermined directions upon zooming. In a first type of conventional or classical drive mechanism which has been used particularly for a single lens reflex camera in which no focal shift during zooming is accepted, the movable zoom lens groups are moved along tracks defined by cam grooves formed on a cam ring so as not to cause a focal shift. In a second type of known drive mechanism for compact cameras or digital cameras in which it is necessary to correctly focus on an object at the time of shutter releasing, the movable zoom lens groups are moved upon zooming while permitting a focal shift, and thereafter the movable lens groups are moved to an in-focus position in accordance with set focal length data and set object distance data upon shutter releasing.

In the second type drive mechanism, separate drive mechanisms for the two movable lens groups are provided, and hence the positions of the lens groups must be controlled. To this end, various types of drive mechanisms have been proposed or used. In conventional drive mechanisms, however, the drive units are harmoniously incorporated in the guide mechanism of the movable zooming lens groups, thus resulting in a complicated assembling operation.

SUMMARY OF THE INVENTION

It is an object of the present invention to provide a drive apparatus for a zoom lens barrel having at least two movable zooming lens groups wherein the barrel body and the drive mechanism thereof are each made of a sub-assembly unit which contributes to an easy assembling operation of the drive apparatus.

To achieve the object mentioned above, according to the present invention, there is provided a drive apparatus for a zoom lens barrel having a plurality of movable zooming lens groups, comprising a lens barrel body which supports lens frames of the movable zooming lens groups to move linearly in the optical axis direction, a lens drive unit which can be assembled independently of the lens barrel body, said barrel body being provided with driven pins provided on the lens frames and projecting outward from the barrel body in the same direction, said lens drive unit being provided with a plurality of drive members having engaging portions engageable with the driven pins, a drive motor which independently drives the drive members and a drive gear which connects the drive members to the drive motor, said lens drive unit being secured to the barrel body so that the driven pins projecting from the barrel body are engaged by the engaging portions of the corresponding drive members.

With this arrangement, the barrel body and the lens drive unit can be separately assembled, thus resulting in a facilitation of the assembling operation.

The drive members can be made of drive plates which move linearly or which are rotatable about an axis. In case of the rotatable drive plates, the drive plates are preferably rotatable about a common shaft, hence the drive apparatus can be made smaller.

The barrel body is preferably provided with a spring means for biasing the movable zooming lens groups in one of the optical directions to remove the backlash.

In an embodiment, the barrel body is split into a front barrel block and a rear barrel block, so that a diaphragm block having a plurality of diaphragm blades and a diaphragm opening and closing ring which is adapted to open and close the diaphragm blades can be held between the front and rear barrel blocks. With this arrangement, the diaphragm block can be made as a sub-assembly unit. The movable zooming lens groups are practically located within the front and rear barrel blocks.

The present disclosure relates to subject matter contained in Japanese Patent Application No. 8-332075 (filed on Dec. 12, 1996) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 6:
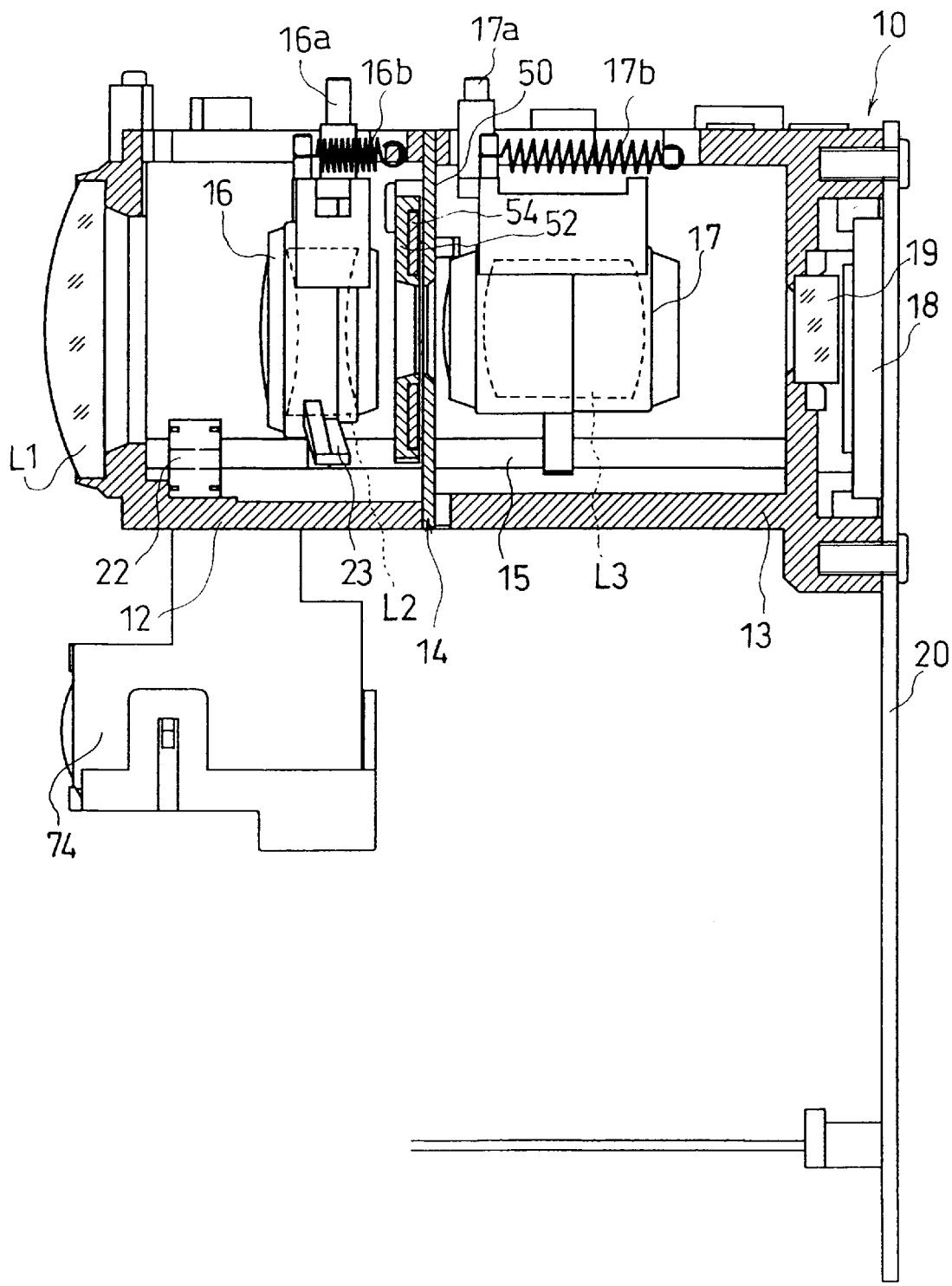
FIG. 6 is a longitudinal sectional view of FIG. 5 at a telephoto extremity.
Figure 7:
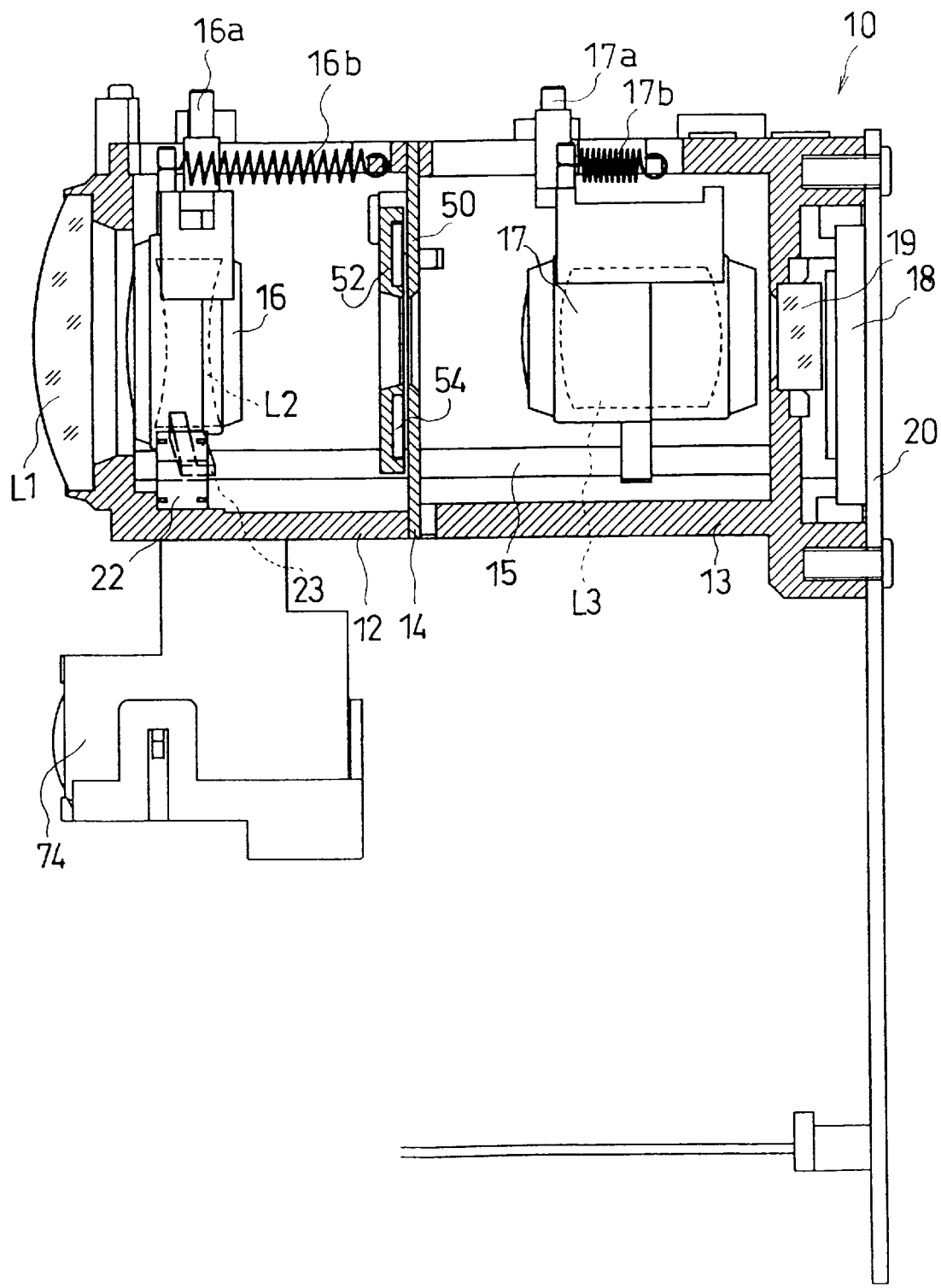
FIG. 7 is a longitudinal sectional view of FIG. 5 at a wide-angle extremity.
Figure 8:
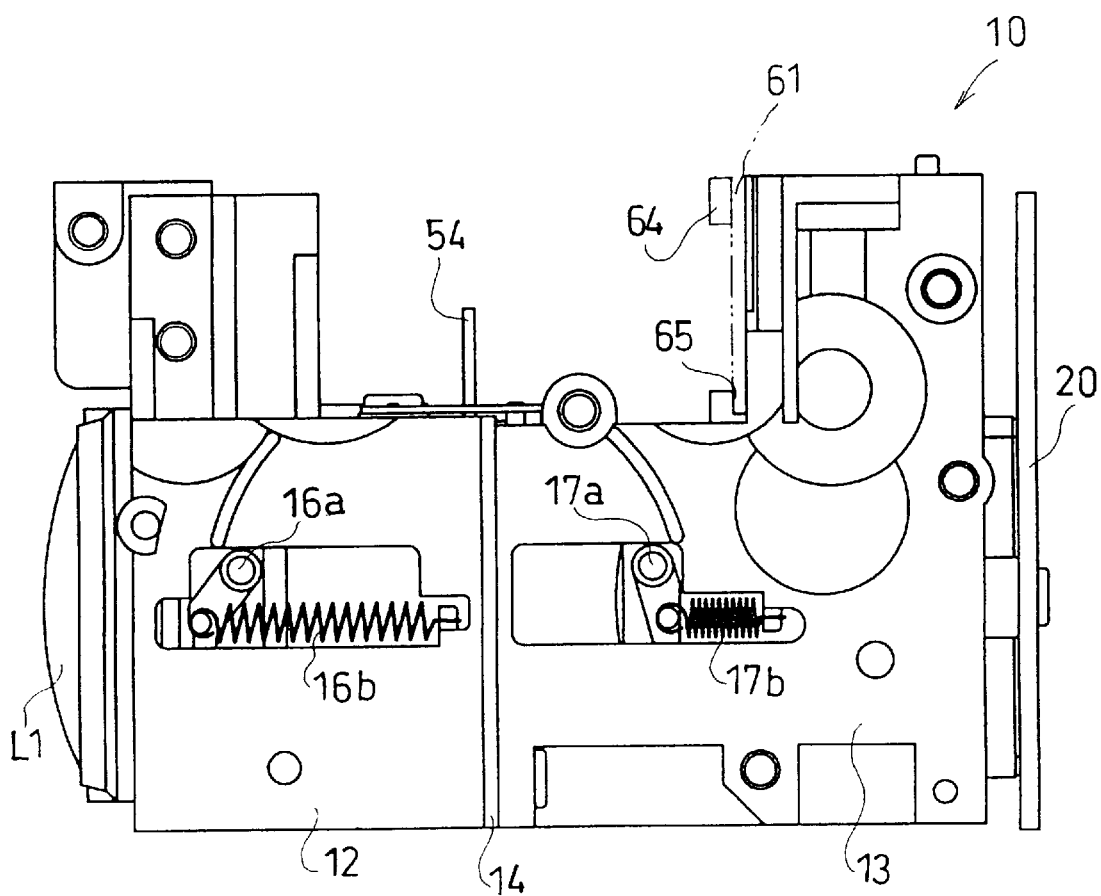
FIG. 8 is an end view viewed from the direction indicated by an arrow VIII in FIG. 5.

A zoom lens barrel according to an embodiment of the present invention is applied to a digital camera using a CCD. The zoom lens system is comprised of three lens groups consisting of a first stationary lens group L1 of positive power, a second movable lens group L2 of negative power, and a third lens group L3 of positive power, as shown in FIGS. 6 and 7. The zoom lens system constitutes a variable focus lens in which the zooming operation is carried out by moving the second and third lens groups L2 and L3, and the focusing operation is carried out by moving the second lens group L2. However no cam groove is used to effect the position control of the second and third lens groups L2 and L3. Namely, the position of the second lens group L2 is controlled, in accordance with set focal length information (data) and detected objected distance information (data) using an open-loop control system and the position of the third lens group L3 is controlled using a closed-loop control system.

Figure 1:
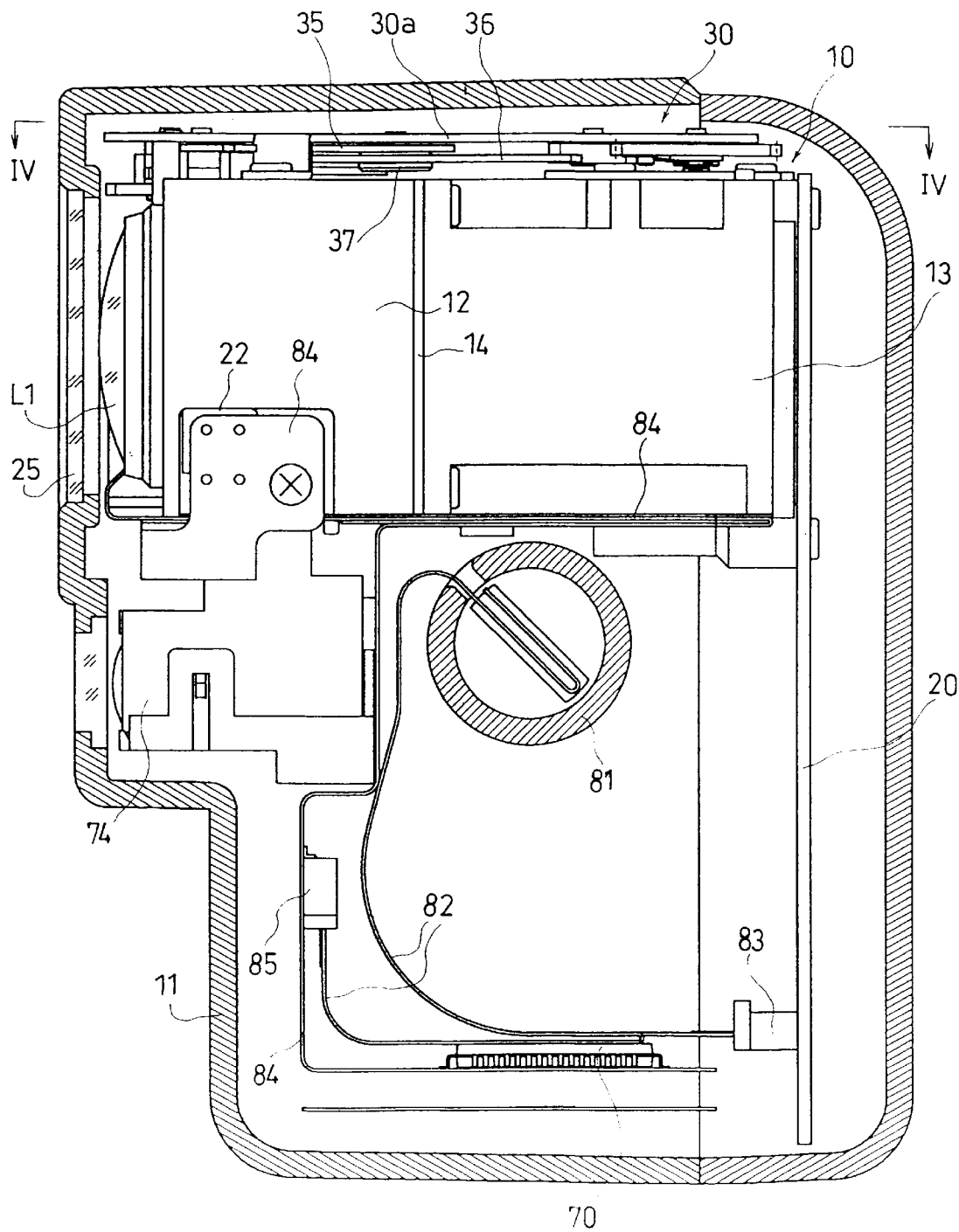
FIG. 1 is a left side view of a zoom lens barrel in which the casing is sectioned.
Figure 2:
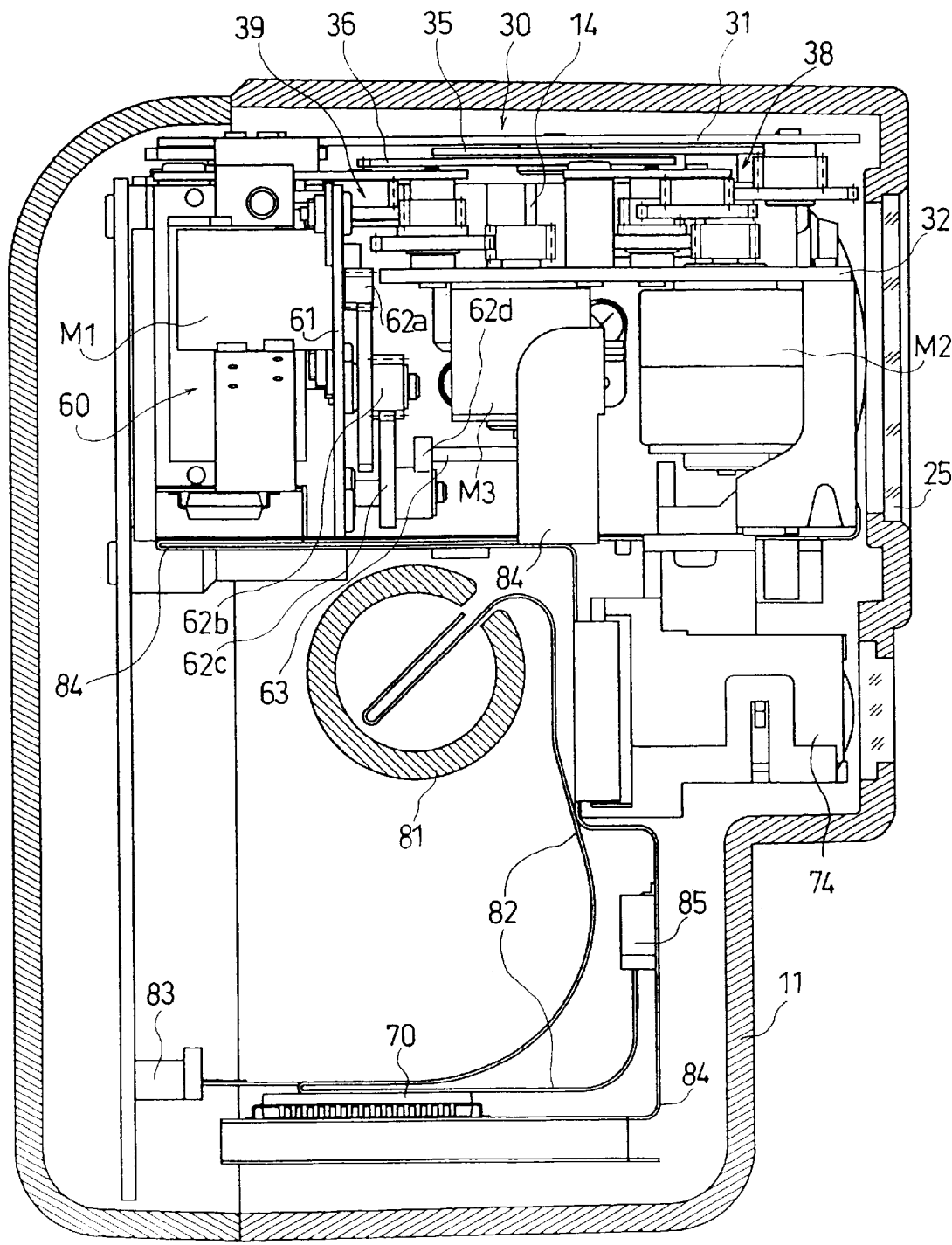
FIG. 2 is a right side view of FIG. 1.
Figure 3:
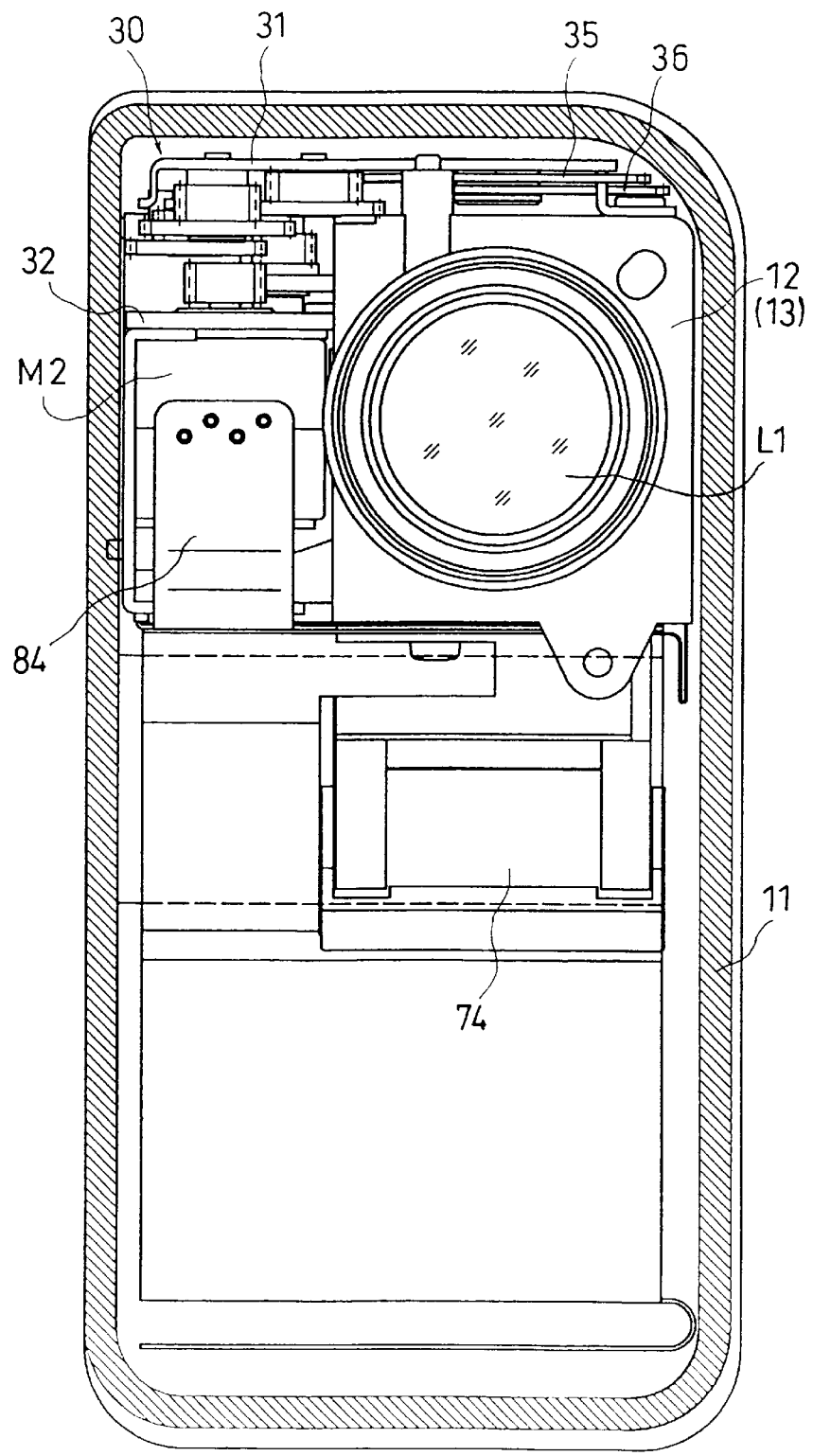
FIG. 3 is a front elevational view of FIG. 1.
Figure 4:
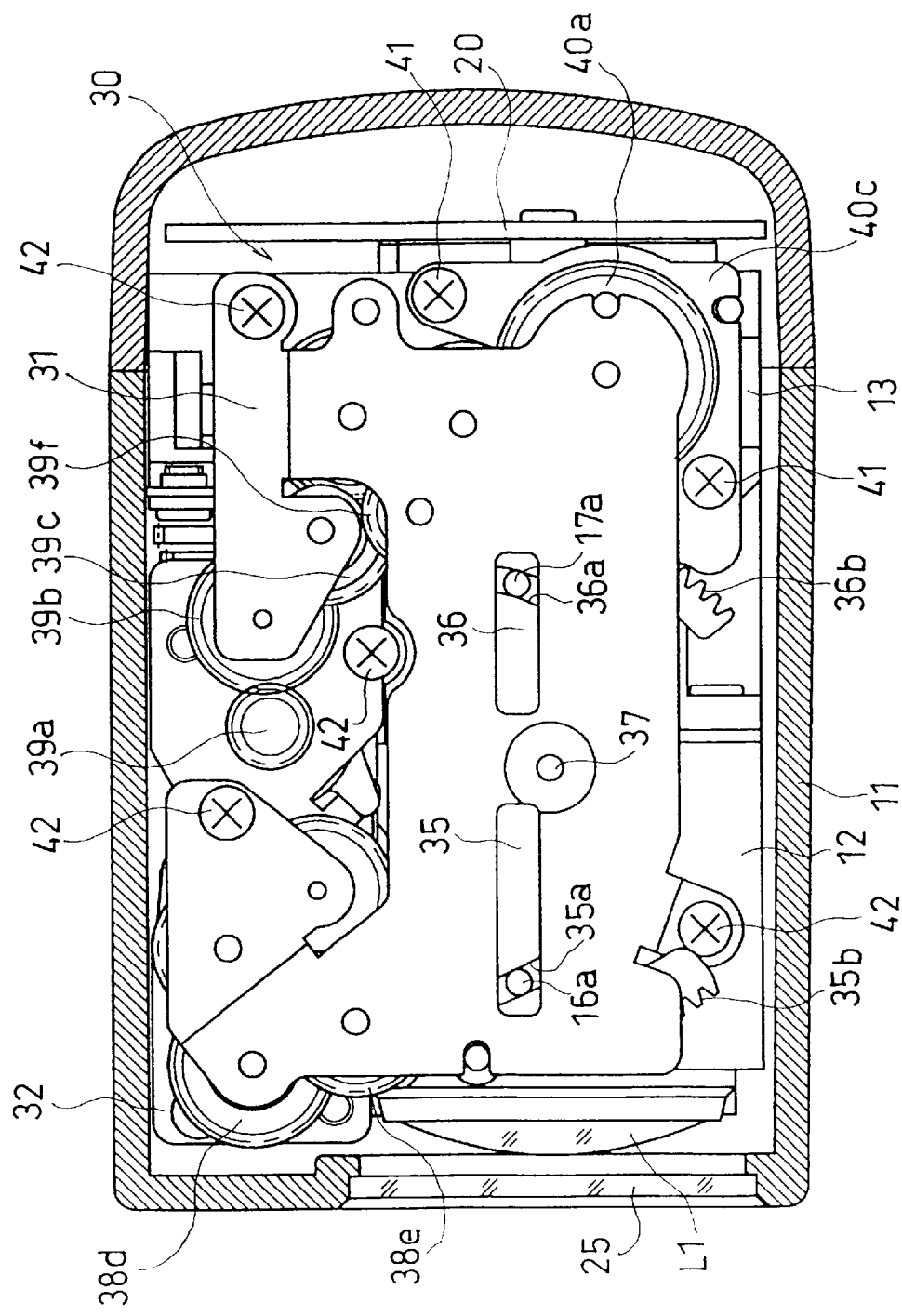
FIG. 4 is a sectional view taken along the line IV—IV in FIG. 1.
Figure 5:
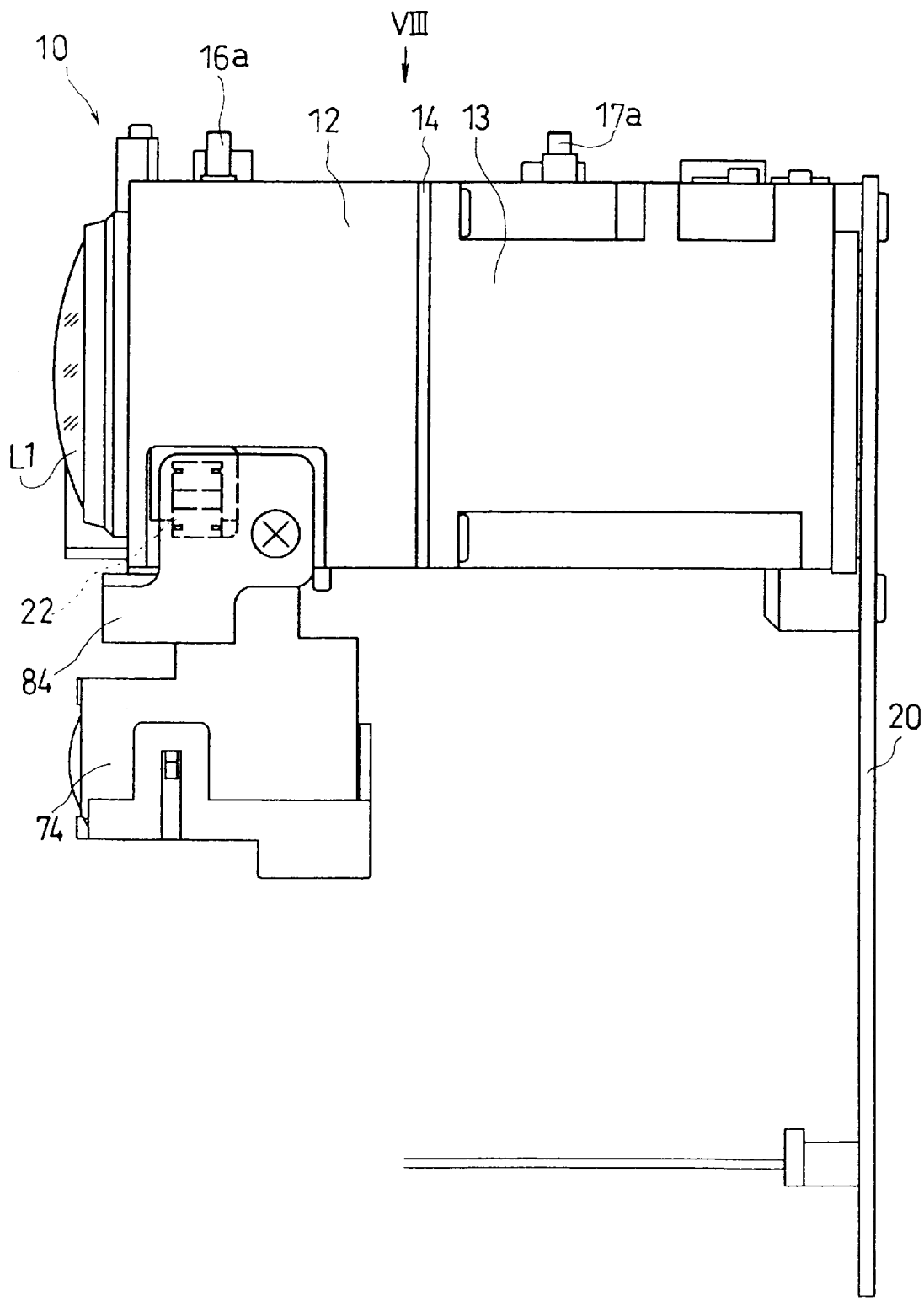
FIG. 5 is a left side view of a lens barrel body before a lens drive unit is incorporated.
Figure 9:
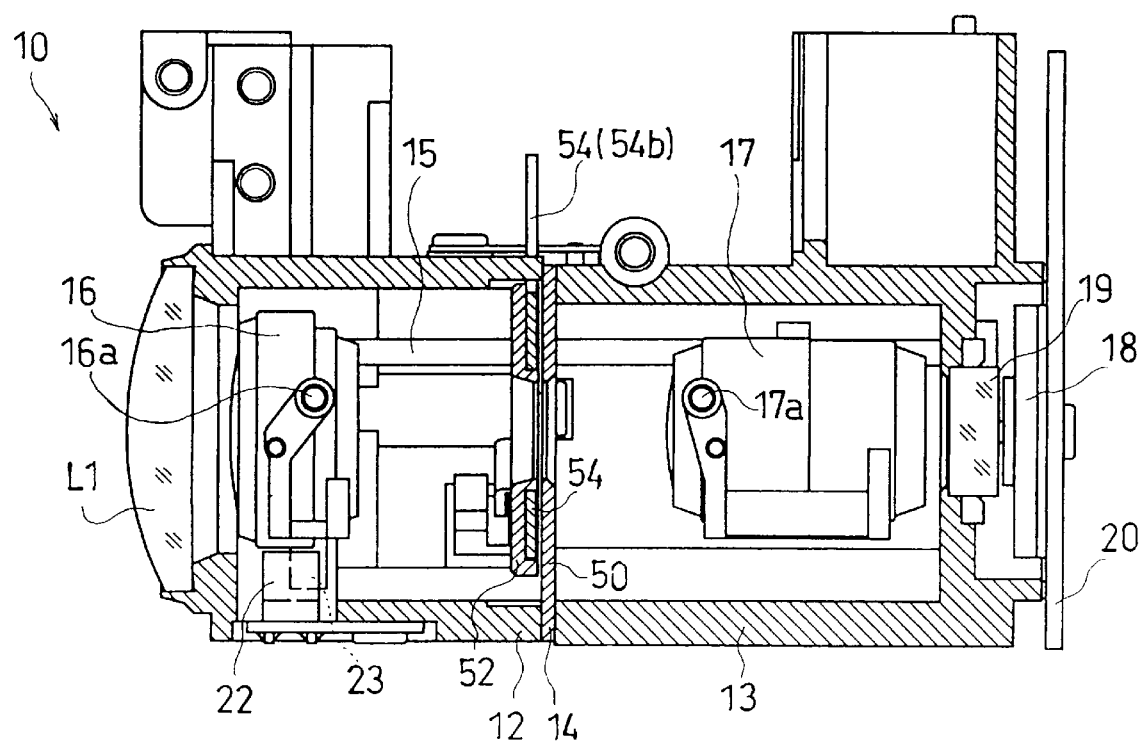
FIG. 9 is a cross sectional view of FIG. 8.

As may be seen in FIGS. 5 through 9, the lens barrel body 10 located in the lens casing 11 is composed of a front plastic body 12, a rear plastic body 13, and a diaphragm block 14 held between the front and rear plastic bodies 12 and 13. There are a plurality of guide rods 15 (only one rod is shown in FIGS. 6, 7 and 9) extending between the front and rear bodies 12 and 13 in parallel with the optical axis. A second lens frame 16 which holds the second lens group L2 and a third lens frame 17 which holds the third lens group L3 are movable, guided by the guide rods 15. The CCD (image pickup device) 18 is provided behind the third lens frame 17 and is provided with a substrate 20 which is secured to the rear body 13. A crystal filter 19 is provided between the third lens frame 17 and the CCD 18. The casing 11 is provided with a glass cover (plane-parallel plate) 25 (FIGS. 1, 2 and 4) secured thereto and provided in front of the first lens group L1.

The second lens frame 16 and the third lens frame 17 are respectively provided with second and third parallel lens pins (second and third driven pins) 16a and 17a. The second and third lens frames 16 and 17 are biased rearwardly (toward the CCD 18) by tensile springs 16b and 17b, respectively for removing a backlash.

The front body 12 is provided with a photodetector (origin sensor) 22 to detect the origin of the second lens frame 16 (second lens group L2). The second lens frame 16 is equipped with a dog plate 23 secured thereto to cooperate with the photodetector 22. In the illustrated embodiment, the origin of the second lens group L2 corresponds to an infinite object distance at the wide-angle extremity. When the second lens group L2 is located at the origin, the dog is plate 23 interrupts the light from the photodetector 22 to detect the origin. The displacement of the second lens group L2 from the origin is controlled by a lens controller (CPU) 70 (FIG. 18) which controls the number of driving pulses of a second lens pulse motor M2 which drives the second lens group L2. Alternatively, it is also possible to control the displacement of the second lens group L2 from the origin using a pulser.

As may be supposed from the telephoto position shown in FIG. 6 and the wide-angle position shown in FIG. 7, when the focal length varies from the telephoto extremity toward the wide-angle extremity, the second lens frame 16 (second lens group L2) is moved forward and the third lens frame 17 (third lens group L3) is moved rearward. Namely, when the focal length is changed, the second and third lens frames 16 and 17 (second and third lens groups L2 and L3) are moved in opposite directions.

A lens drive mechanism 30 which drives the second lens frame 16 and the third lens frame 17 in the lens barrel body 10 is assembled as a lens drive unit which is attached to bridge the front body 12 and the rear body 13. The lens drive unit 30 will be discussed below with reference to FIGS. 1 through 4 and FIGS. 10 through 13.

Figure 10:
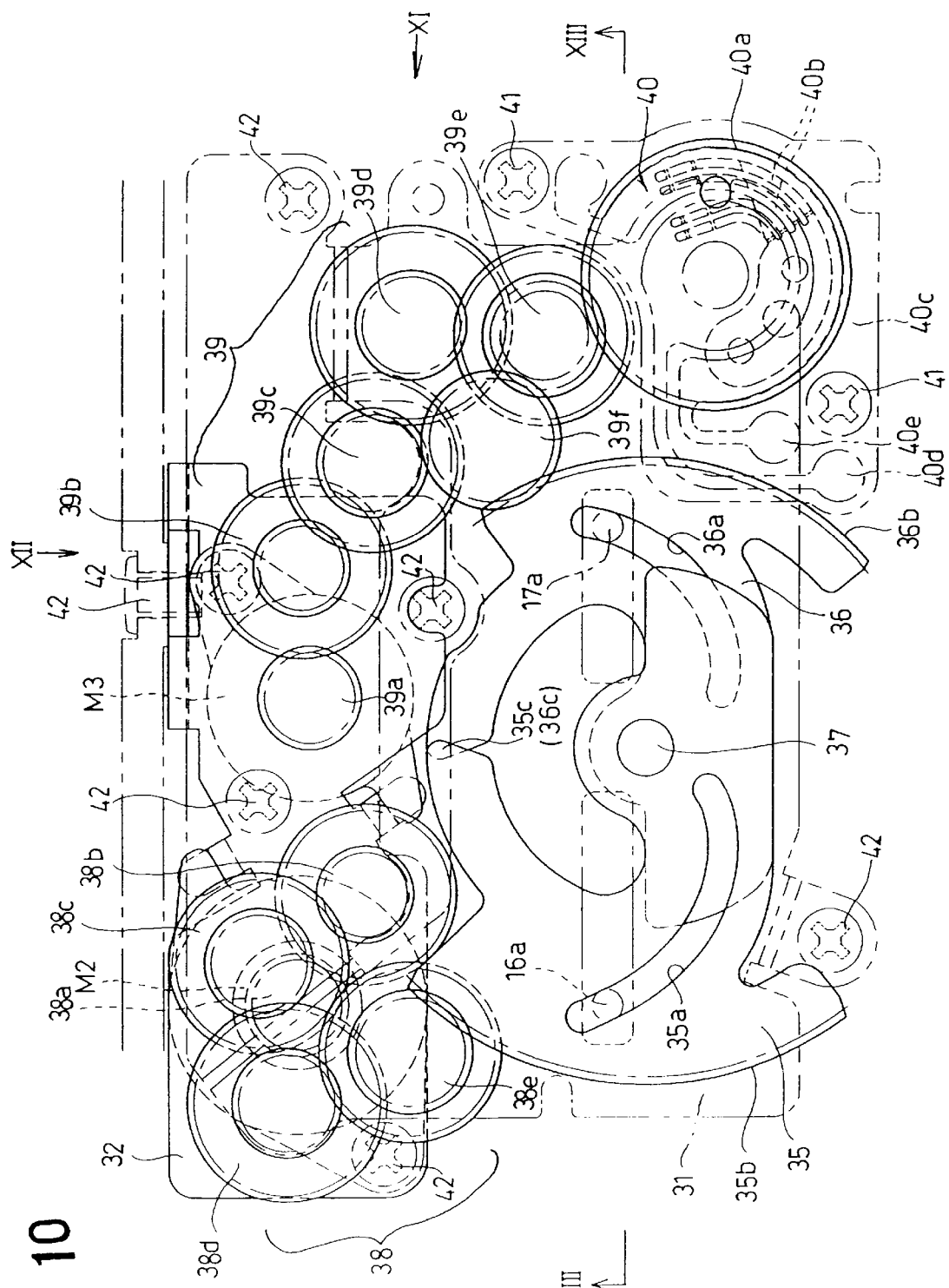
FIG. 10 is a plan view of a lens drive unit.
Figure 11:
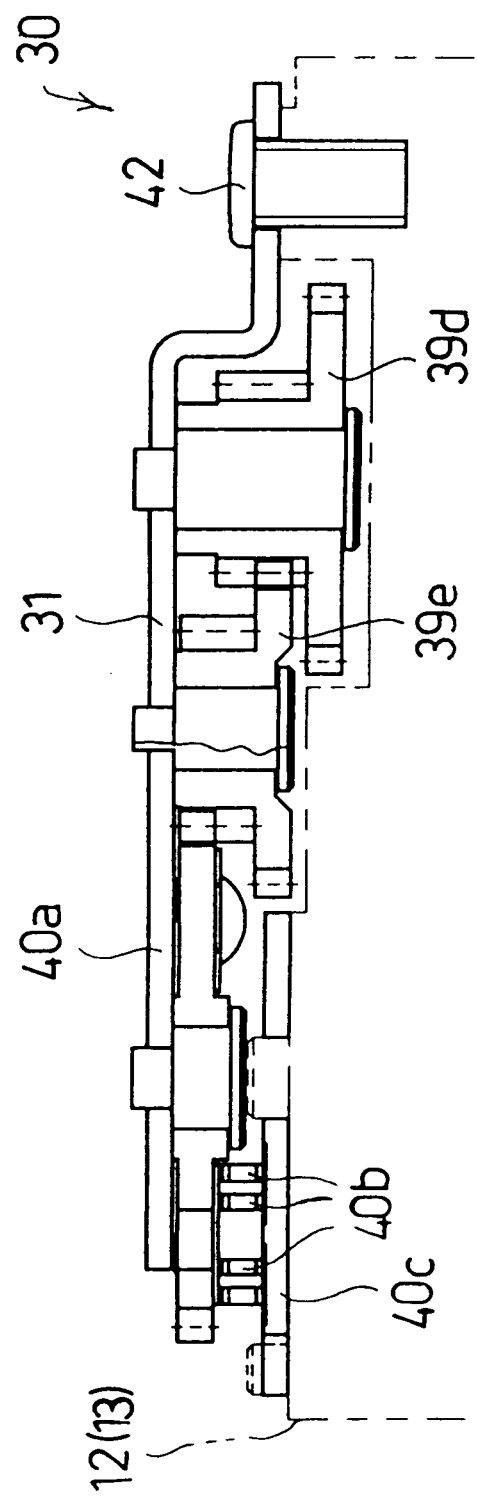
FIG. 11 is an end view viewed from the direction indicated by an arrow XI in FIG. 10.

The lens drive unit 30 is provided with first and second mother plates 31 and 32 which lie stepwise in different heights. In FIG. 10, for clarity, the upper first mother plate 31 is indicated by a dotted line and the lower second mother plate 32 is indicated by a solid line, respectively. The second lens pulse motor M2 and a third lens motor M3 are secured to the lower surface of the lower mother plate 32 so that the drive shafts of the motors M2 and M3 extends in a direction perpendicular to the second mother plate 32. A second-lens drive plate 35 which is provided with a cam groove (lead groove) 35a in which the second lens cam pin 16a of the second lens frame 16 is fitted and a third-lens drive plate 36 which is provided with a cam groove (lead groove) 36a in which the third lens cam pin 17a of the third lens frame 16 is fitted are coaxially pivoted to the first mother plate 31 through a common shaft 37. The second-lens drive plate 35 and the third-lens drive plate 36 are relatively rotatable and lie in parallel planes at different heights. The second lens cam pin 16a and the third lens cam pin 17a are always pressed against the rear surfaces (adjacent to the CCD 18) of the cam grooves 35a and 36a by the tensile springs 16b and 17b to eliminate the backlash, respectively.

A gear mechanism 38 which transmits the rotation of the second lens pulse motor M2 to the second-lens drive plate 35, a gear mechanism 39 which transmits the rotation of the third lens motor M3 to the third-lens drive plate 36, and a volume mechanism (variable resistor) 40 are provided between the first and second mother plates 31 and 32. A first gear 38a secured to the output shaft of the second lens pulse motor M2 is functionally connected to a sector gear 35b formed on the outer peripheral surface of the second-lens drive plate 35 through a second gear 38b, a third gear 38c, a fourth gear 38d and a fifth gear 38e. Each of the gears from the second gear 38b through to the fifth gear 38e are a double gears having two spur gears in different axial positions.

A first gear 39a secured to the output shaft of the third lens motor M3 is functionally connected to a sector gear 36b formed on the outer peripheral surface of the third-lens drive plate 36 through a second gear 39b, a third gear 39c, a fourth gear 39d and a fifth gear 39e. Each of gears from the second gear 39b through to the fifth gear 39e are double gears having two spur gears in different axial positions. The fifth gear 39e is in mesh with a sixth gear 39f of the gear mechanism 39 and with a rotatable brush gear 40a of the volume mechanism 40. The brush gear 40a is provided on the rear surface thereof with a brush 40b secured thereto. A resistor plate 40c is secured to the rear body 13 independently of the lens drive unit 30 (before the lens drive unit 30 is attached), so that the resistor 40c comes into contact with the brush 40b. The resistance between two terminals 40d and 40e of the resistor plate 40c varies in accordance with the angular position of the brush gear 40a, and hence, the resistance corresponding to the angular position of the third-lens drive plate 36, i.e., the absolute position of the third lens frame 17 (third lens group L3) can be obtained.

The second-lens drive plate 35 and the third-lens drive plate 36 are coaxially supported by the common shaft 37, as mentioned above. The profiles of the cam grooves 35a and 36a are such that when the second-lens drive plate 35 and the third-lens drive plate 36 rotate in the same direction, i.e., counterclockwise direction in FIG. 10, both the second lens frame 16 (cam pin 16a) and the third lens frame 17 (cam pin 17a) are moved forward. On the other hand, since the second lens frame 16 (second lens group L2) and the third lens frame 17 (third lens group L3) are moved in opposite directions when the focal length varies, as mentioned above, the directions of the rotation of the second-lens drive plate 35 and the third-lens drive plate 36 upon zooming are always opposite when either the focal length is reduced from the telephoto extremity or the focal length is increased from the wide-angle extremity. With this arrangement in which the second-lens drive plate 35 and the third lens drive plate 36 are rotatably mounted to the common shaft 37 and the rotation of the drive plates in opposite directions causes the second and third lens groups L2 and L3 to move in opposite directions, the lens barrel can be miniaturized.

Figure 12:
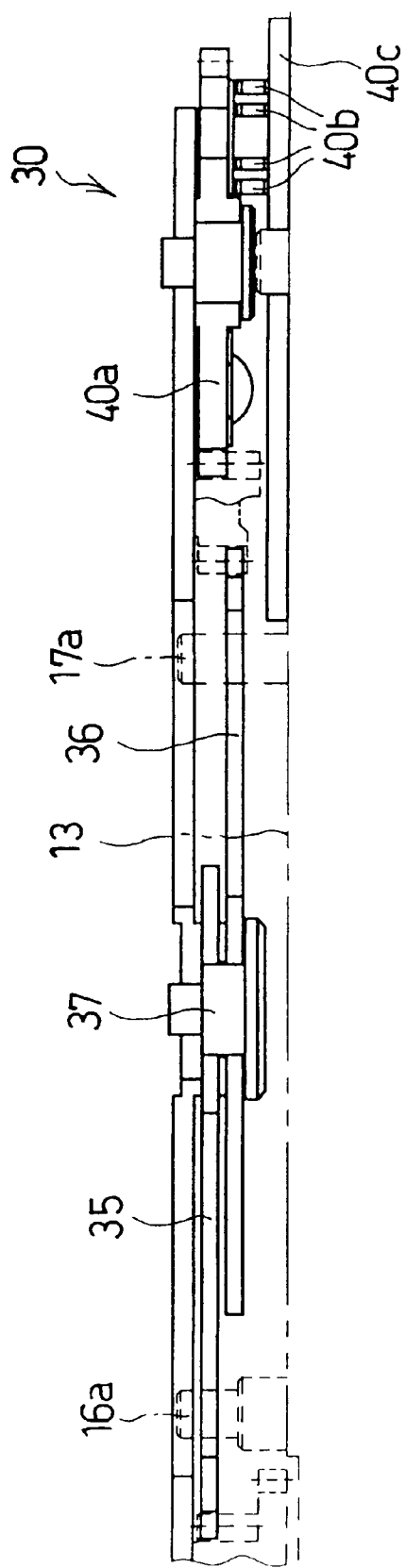
FIG. 12 is an end view viewed from the direction indicated by an arrow XII in FIG. 10.
Figure 13:
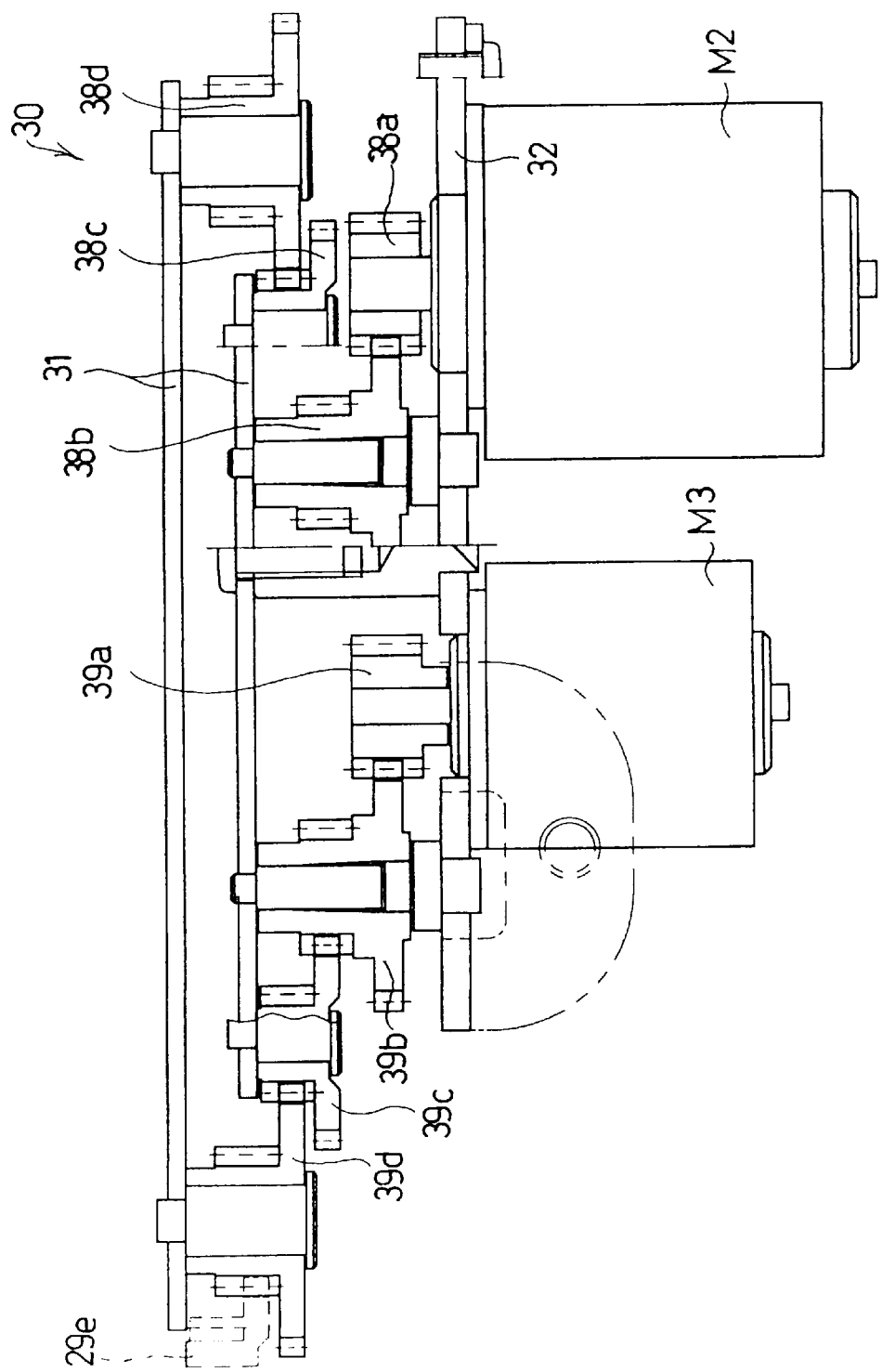
FIG. 13 is a sectional view taken along the line XIII—XIII in FIG. 10.
Figure 14:
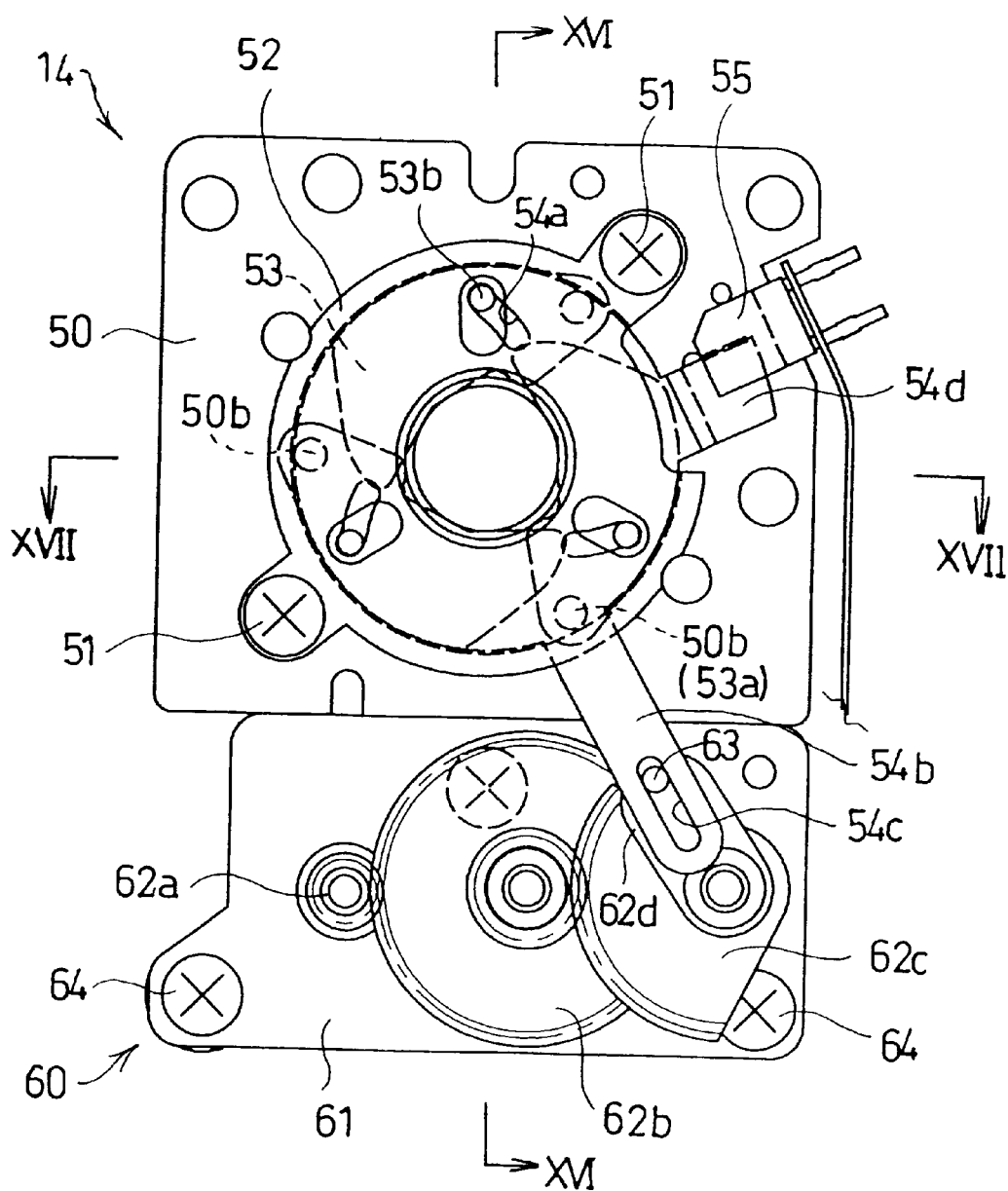
FIG. 14 is a front elevational view of a diaphragm drive unit in a full-open aperture position.
Figure 15:
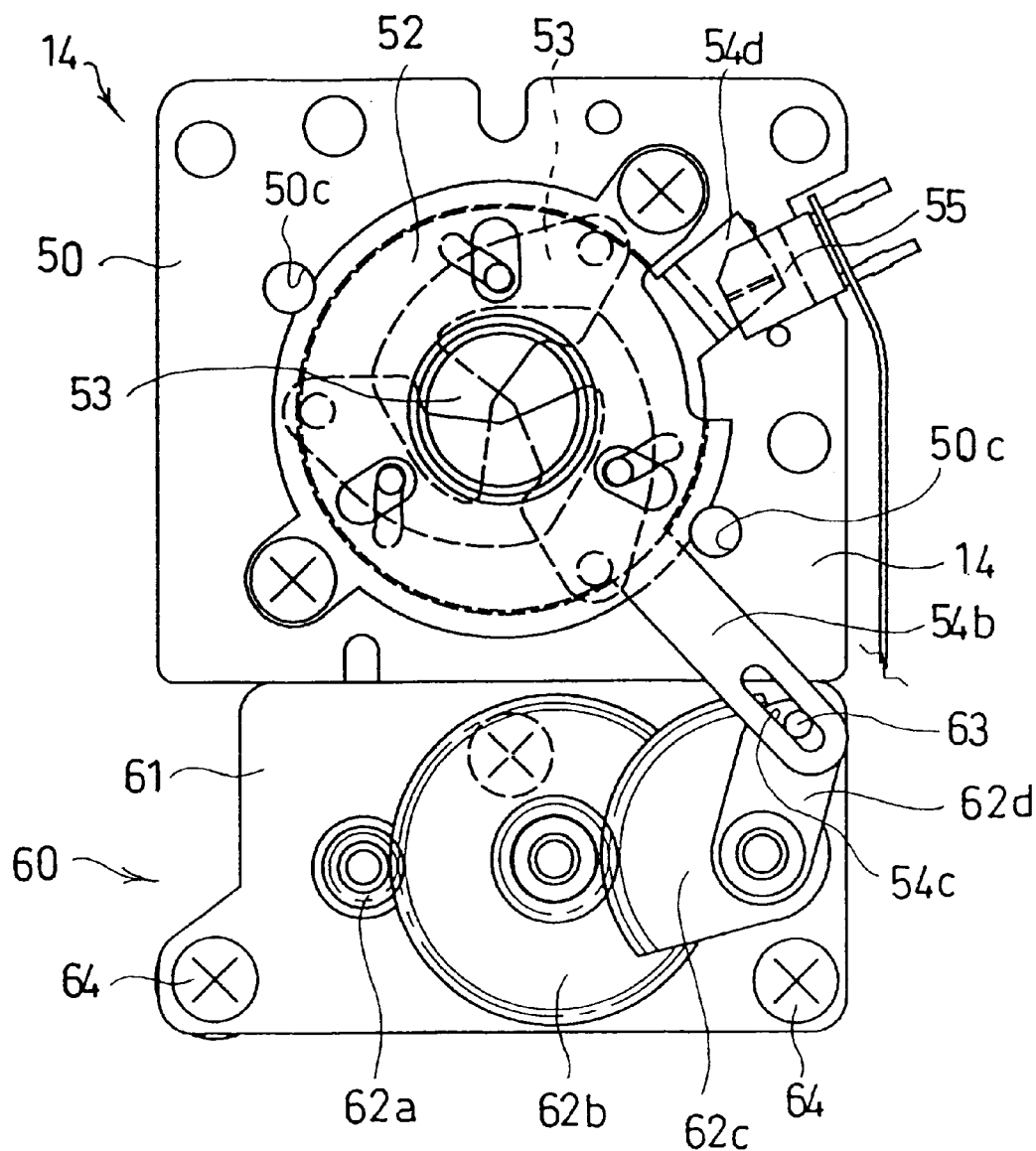
FIG. 15 is a front elevational view of a diaphragm drive unit in a minimum aperture position.
Figure 16:
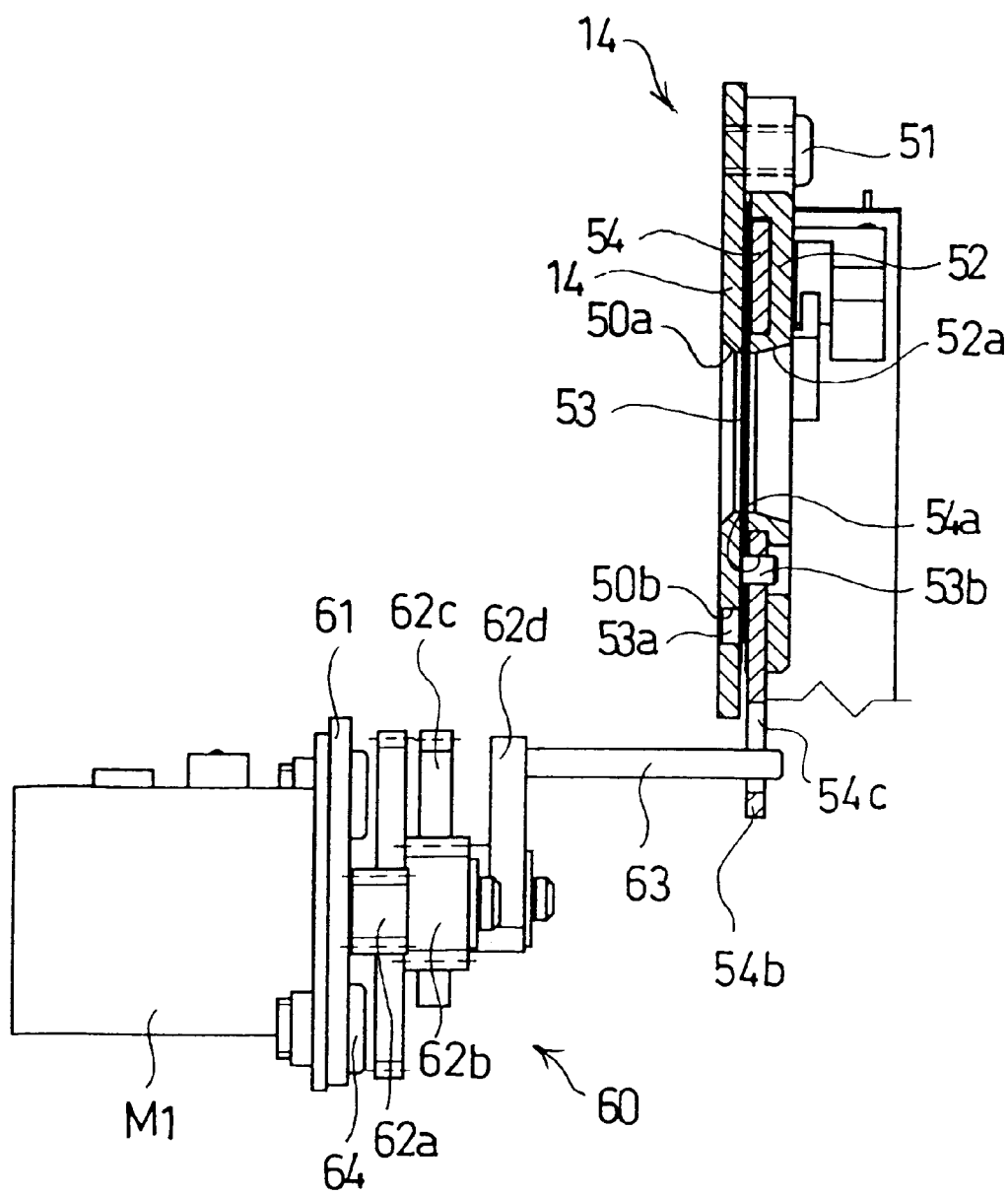
FIG. 16 is a sectional view taken along the line XVI—XVI in FIG. 14.
Figure 17:
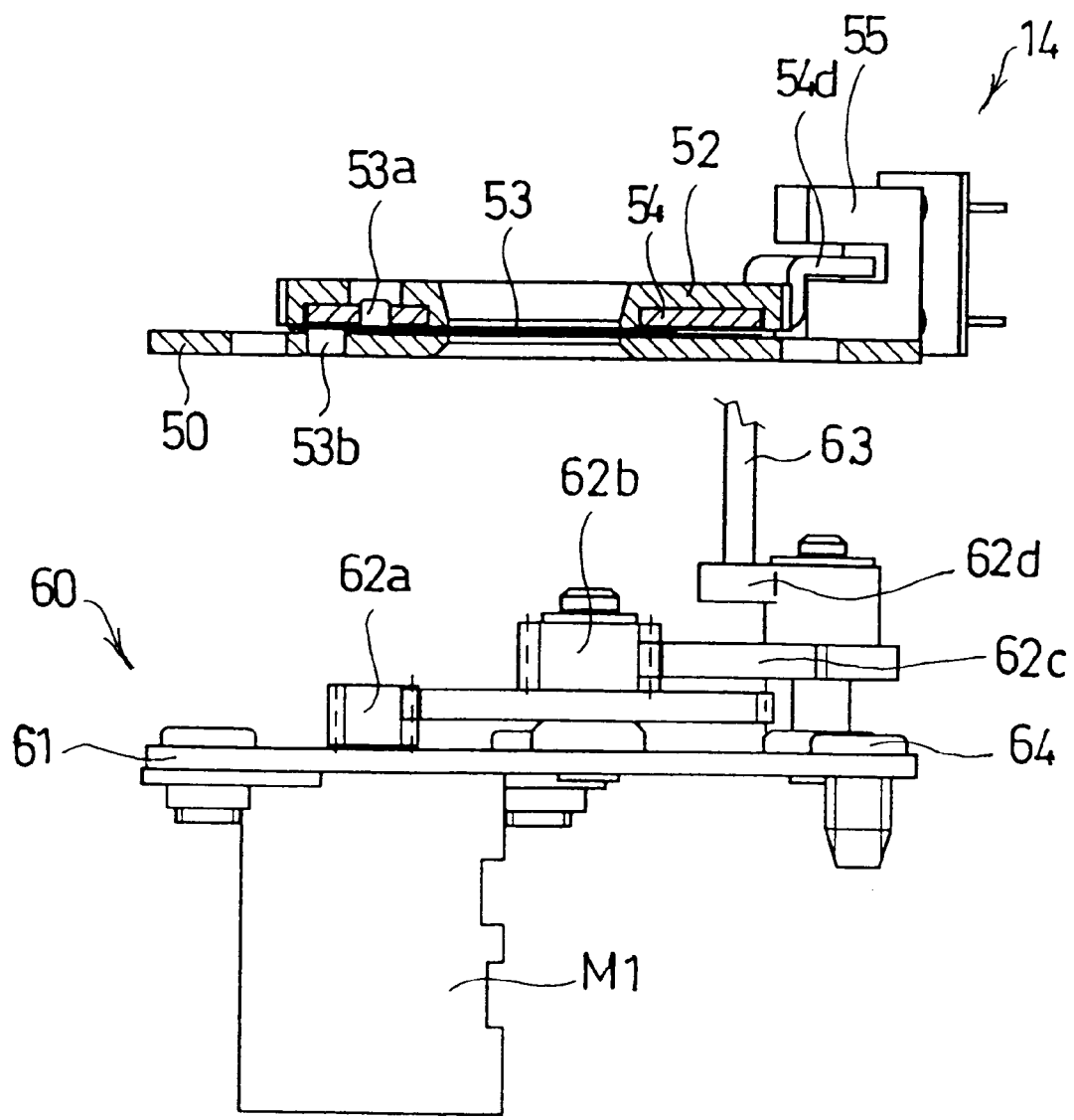
FIG. 17 is a sectional view taken along the line XVII—XVII in FIG. 14.

The second-lens drive plate 35 and the third lens drive plate 36 are each made of a plate and are located at slightly different positions in the axial direction of the common shaft 37, as can be seen in FIGS. 10 and 12. The drive plates 35 and 36 are in the form of a generally sectoral shape to reduce the weight and size. If the drive plates 35 and 36 can be each made of a circular plate (disc shape), no interference between the drive plates will occur at any angular position. However, since the drive plates 35 and 36 are each in the shape of generally sectional shape, there is a possibility that they might interfere with each other at the front end surfaces thereof in the thickness direction, depending on the angular position, when the sector member deforms in the thickness direction.

To prevent possible interference, the second-lens drive plate 35 and the third-lens drive plates 35 and 36 are provided on the front ends thereof with wing portions 35c and 36c which overlap in a plan view when the maximum angular displacement of the drive plates 35 and 36 in opposite directions takes place. FIG. 10 shows a wide-angle position in which the second-lens drive plate 35 is rotated by the maximum angular displacement in the counterclockwise direction, and the third-lens drive plate 36 is rotated by the maximum angular displacement in the clockwise direction, respectively. In this state, the wing portions 35c and 36c overlap in a plan view. In other words, the drive plates 35 and 36 are each made of a generally sectoral shape plate which is made as small as possible and are provided on the front ends thereof with the wing portions 35c and 36c which partly overlap in a plan view at any angular position of the lens drive plates 35 and 36, and thus, a smooth rotation of the lens drive plates 35 and 36 can be ensured over the entire angular displacement.

The lens drive unit 30 (except for the resistor plate 40c) as constructed above is formed as a unit separate from the lens barrel body 10 or the diaphragm block 14. The resistor plate 40c is secured to the rear body 13 by means of a plurality of screws 41 and is thereafter secured to the lens barrel body 10 (front body 12 and rear body 13) by means of a plurality of screws 42.

The diaphragm block 14 held between the front body 12 and the rear body 13 and the drive unit 60 thereof will be explained below with reference to FIGS. 14 through 17. A substrate 50 of the diaphragm block 14 and a retainer 52 which is secured to the diaphragm block 14 by screws 51 are provided with apertures 50a and 52a on the optical axis, respectively. The substrate 50 is provided with a plurality of holes 50b formed around the aperture 50a in equi-angular distance, in each of which the first of a pair of dowels 53b of diaphragm blades 53 is inserted. An opening and closing ring 54 is rotatably provided between the substrate 50 and the retainer 52. The opening and closing ring 54 is provided with a plurality of cam holes 54a at equi-angular distance as the holes 50b in each of which the second of the pair of the dowels 53b of the diaphragm blade 53 is fitted. In the above-mentioned diaphragm mechanism which is per se known, when the opening and closing ring 54 is rotated, the size of the aperture defined by the blades 53 is varied between the full-open position (maximum aperture) and the smallest aperture (minimum aperture).

The opening and closing ring 54 is provided with a radially extending arm 54b which is in turn provided with a radially extending association groove 54c. A photodetector (origin sensor) 55 which detects the origin of the diaphragm mechanism is secured to the diaphragm block 14. The substrate 50 is provided with a dog 54d projecting therefrom, corresponding to the photodetector 55. In the illustrated embodiment, the full-open position of the diaphragm (aperture) corresponds to the origin so that the dog 54d interrupts light from the photodetector 55 to detect the origin. The set diaphragm value (angular displacement of the opening and closing ring 54) when the aperture size is reduced from the full-open position by the opening and closing ring 54 is fed to the lens controller 70 (FIG. 18) which controls the number of driving pulses of the diaphragm pulse motor M1. Alternatively, it is possible to control the displacement from the origin (i.e., the diaphragm value) using a pulser.

The drive unit 60 as a separate unit is secured to the rear body 13 at a position different from the substrate 50 of the diaphragm block 14 in the optical axis direction and radial direction. The diaphragm pulse motor M1 is secured to the substrate 61 of the drive unit 60. A first gear 62a secured to the output shaft of the diaphragm pulse motor M1 is connected to the sector gear 62c through a second gear 62b. The sector gear 62c is provided with a radial arm 62d integral therewith, which is in turn provided with an association pin 63 which is fitted in the radial association groove 54c of the opening and closing ring 54. The second gear 62b is a double gear having a pair of coaxial spur gears.

The diaphragm block 14 and the drive unit 60 are each pre-assembled as a unit. The substrate 50 of the diaphragm block 14 is held between the front and rear bodies 12 and 13. The substrate 61 of the drive unit 60 is secured to the rear body 13 by means of a plurality of screws 64, so that the association pin 63 is fitted in the radial association groove 54c of the opening and closing ring 54 and one end of the substrate 61 is held in a holding groove 65 (FIG. 8) of the rear body 13.

Figure 18:
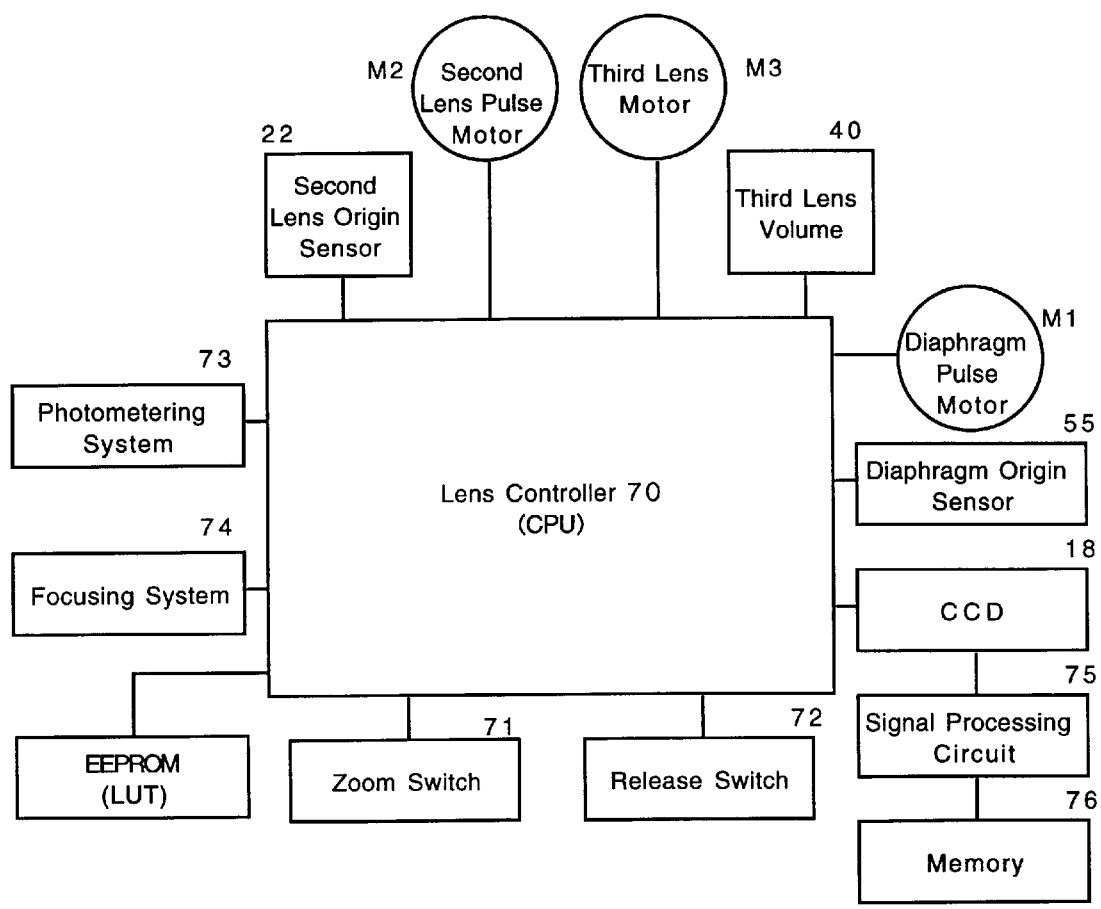
FIG. 18 is a block diagram of a control system in a zoom lens barrel according to the present invention.

FIG. 18 shows a control system of the zoom lens barrel constructed above. Connected to the lens controller (CPU) 70 is the diaphragm pulse motor M1, the second lens pulse motor M2, the third lens motor M3, the third lens volume 40, the diaphragm origin detector 55, the CCD 18, a zoom switch 71, a release switch 72, a photometering device 73, an object distance detecting device 74 and an EEPROM. In general, the CCD 18 can constitute the photometering device 73. The object distance detecting device 74 can be either of a passive type or an active type. In the embodiment illustrated in FIGS. 1 through 3, the object distance detecting device 74 is a passive system. Image data formed on the CCD 18 is converted to an electric signal which is recorded in the memory 76 through the signal processing circuit 75.

The lens casing 11 is connected, to the substantially central portion thereof, to a body casing (not shown) through the cylindrical boss 81 (FIGS. 1 and 2) so as to rotate by an angle less than 270°. The body casing is equipped with the zoom switch 71, the release switch 72, the signal processing circuit 75, the memory 76, a liquid crystal display (LCD) panel with a finder function, in which the object image formed on the CCD 18 is displayed, a body CPU, and various switches, etc. The electric circuits in the body casing are connected to the electric circuits in the lens casing 11 through a body-lens connecting FPC board (flexible printed circuit board) 82 which extends through the cylindrical boss 81. Namely, the FPC board 82 connected to the CPU within the body casing is connected to a connector 83 provided on the substrate 20 and a connector 85 provided on an FPC board 84 on the lens side, through the cylindrical boss 81. The FPC board 84 on the lens side is provided with a printed circuit to which all the electrical elements within the casing 11 are connected and electronic devices such as the lens CPU 70, etc.

The components related to the barrel body, such as motors, connected to the lens FPC board 84 are located above the cylindrical boss 81, and the lens CPU 70 is located below the cylindrical boss 81. Thus, the components such as the motors, which generate an electric noise and the lens CPU 70 which tends to be influenced by the noise are provided on opposite sides of the cylindrical boss 81. Consequently, no mal-function occurs.

The basic operation of the zoom lens barrel constructed as above operates as follows.

At the wide-angle extremity shown in FIG. 7, if the zoom switch 71 is operated toward the wide-angle position, the second lens frame 16 (second lens group L2) is moved forward through the second lens pulse motor M2, the gear mechanism 38 and the second-lens drive plate 35; the third lens frame 17 (third lens group L3) is moved rearward through the third lens motor M3, the gear mechanism 39 and the third-lens drive plate 36. Similarly, if the zoom switch 71 is operated toward the telephoto position at the telephoto extremity shown in FIG. 6, the second lens frame 16 (second lens group L2) is moved rearward and the third lens frame 17 (third lens group L3) is moved forward. Information concerning the displacement of the second lens frame 16 from the origin is determined by the number of driving pulses of the second lens pulse motor M2 and fed from the lens controller 70, and the position information of the third lens frame 17 is determined based on position data detected by the third lens volume 40. It is not always necessary to focus on the object or prevent a focal shift from occurring during the zooming operation.

The position of the third lens group L3 detected by the third lens volume 40 is an absolute value, and hence the set focal length is determined with reference to the position of the third lens group. When the operation force of the zoom switch 71 is released, it does not matter if the focus condition is out of focus.

When the release switch 72 is depressed by half a step, the photometering device 73 and the object distance detecting device 74 are activated to obtain object brightness data and object distance data. When the release switch 72 is depressed by a full step, the image pickup operation is carried out by the CCD 18. Before the release switch 72 is fully depressed, the diaphragm value is set in accordance with the object brightness data detected by the photometering device 73 by the diaphragm pulse motor M1, the diaphragm origin sensor 55 and the lens controller 70; the second lens group L2 is moved to a in-focus position in accordance with the set focal length data and the object distance data detected by the object distance detecting device 74, the second lens pulse motor M2, the second lens origin sensor 22 and the lens controller 70. Namely, when the absolute position of the third lens group L3 is determined in accordance with the focal length set by the zoom switch 71, the position of the second lens group L2 can be determined in accordance with the set focal length and the object distance data detected by the object distance detecting device 74. Thus, an in-focus object image is formed on the CCD 18, so that the image pickup operation can be carried out.

According to the present invention, in a zoom lens barrel having at least two movable zooming lens groups, the barrel body and the drive mechanism (lens drive unit) therefor form sub-assembly units, thus resulting in an easy assembling operation of the drive apparatus.

What is claimed is:

1. A drive apparatus for a zoom lens barrel having a plurality of movable lens groups, comprising:

a lens barrel body which supports lens frames of the movable lens groups to move linearly in the optical axis direction;

a lens drive unit which is assembled independently of the lens barrel body;

driven pins provided on the lens frames and projecting outward from the barrel body in the same direction; and a plurality of drive members having engaging portions engageable with the driven pins, a drive motor which independently drives the drive members and drive gears which connect the drive members to the drive motor, said drive members, said drive motor and said drive gears being provided in said lens drive unit;

wherein said lens drive unit is secured to the lens barrel body in a state that the driven pins projecting from the lens barrel body are engaged by the engaging portions of the corresponding drive members of the lens drive unit.

2. A drive apparatus for a zoom lens barrel according to claim 1, wherein each of said drive members is made of drive plate which is rotatable about an axis.

3. A drive apparatus for a zoom lens barrel according to claim 2, wherein said drive plates are coaxially pivoted and are rotatable, relative to each other.

4. A drive apparatus for a zoom lens barrel according to claim 1, wherein said lens barrel body is provided with a spring means for biasing the movable lens groups in one of the optical directions.

5. A drive apparatus for a zoom lens barrel according to claim 1, further comprising a diaphragm block having a plurality of diaphragm blades and a diaphragm opening and closing ring which is adapted to open and close the diaphragm blades, said diaphragm block being secured to said lens barrel body.

6. A drive apparatus for a zoom lens barrel according to claim 5, wherein said lens barrel body is split into a front barrel block and a rear barrel block, so that said diaphragm block is held between the front and rear barrel blocks.

7. A drive apparatus for a zoom lens barrel according to claim 6, wherein said movable lens groups are located within the front and rear barrel blocks respectively.

* * * * *